United States Patent [19]

Yajima

[11] 4,366,689
[45] Jan. 4, 1983

[54] NUMERICAL CONTROL METHOD

[75] Inventor: Toshio Yajima, Hiratsuka, Japan

[73] Assignee: Kabushiki Kaisha Komatsu Seisakusho, Tokyo, Japan

[21] Appl. No.: 126,312

[22] Filed: Mar. 3, 1980

[30] Foreign Application Priority Data

Mar. 5, 1979 [JP] Japan .................. 54-25336
Mar. 6, 1979 [JP] Japan .................. 54-25846
Mar. 19, 1979 [JP] Japan .................. 54-32100

[51] Int. Cl.³ .............................................. B21D 5/01
[52] U.S. Cl. ................................................ 72/7; 72/23
[58] Field of Search ............... 72/7, 21, 22, 23, 24, 72/25, 8

[56] References Cited

U.S. PATENT DOCUMENTS

| | | | |
|---|---|---|---|
| 3,633,395 | 1/1972 | Anderson | 72/22 |
| 3,874,205 | 4/1975 | Roch et al. | 72/22 |
| 4,074,350 | 2/1978 | Roch et al. | 72/8 |
| 4,098,105 | 7/1978 | Fullers et al. | 72/21 |
| 4,131,003 | 12/1978 | Foster et al. | 72/7 |
| 4,148,203 | 4/1979 | Farazandeh | 72/21 |

Primary Examiner—Lowell A. Larson
Attorney, Agent, or Firm—Spensley, Horn, Jubas & Lubitz

[57] ABSTRACT

This invention relates to a numerical control method for a press brake or the like. The back stopper is positioned by driving the motor. In the case where it is impossible to bend a working piece because the back stopper interferes with the working piece, the back stopper is retracted with the lid of a retraction instruction and a back stopper position data. Before the back stopper is retracted, the working piece is held by the punch. The program data of each process can be confirmed by using suitable display units.

7 Claims, 14 Drawing Figures

FIG.9
| PROCESS NUMBER | X | Y | α | β | E |
|---|---|---|---|---|---|
| 01 | 001000 | 00200 | +50 | −30 | 0 |
| 02 | 001500 | 00220 | −20 | +10 | 1 |
| 03 | 003000 | 00220 | +00 | +10 | 0 |
| 04 | | | | | |
| 05 | | | | | |
| 06 | | | | | |
| ⋮ | ⋮ | ⋮ | | | |
FIG.10
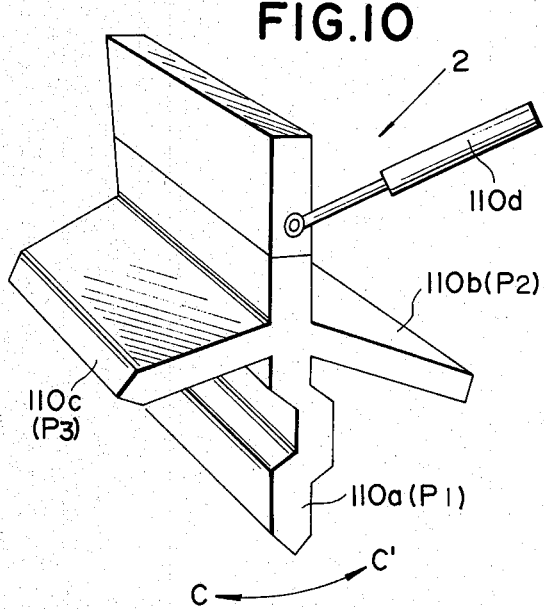
FIG.11
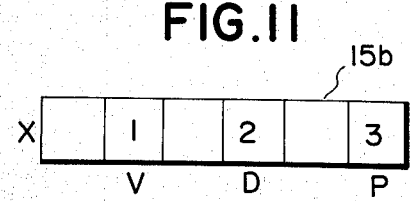

NUMERICAL CONTROL METHOD

BACKGROUND OF THE INVENTION

This invention relates to a numerical control method for a press brake or the like.

In general, a plate bending machine such as a press brake has a punch and a die. A working piece is placed on a die, and the punch is lowered to the working piece whereby the working piece is bent. In this case, it is preferable that the bending operation is carried out by using a back stopper. That is, if the bending operation is carried out after the working piece is abutted against the back stopper which is suitably positioned, then the working piece can be bent as intended.

However, sometimes the back stopper and the working piece may interfere with each other, i.e. the back stopper obstructs the bending of the working piece, in the bending operation, depending on the configuration of the working piece.

In order to overcome this difficulty, a retraction device has been proposed in the art, in which a back stopper is rotatably supported on a mounting stand, and a swinging cylinder is provided between the mounting stand and the body of a plate bending machine, so that in bending a working piece the cylinder is retracted to move the back stopper to a position where the back stopper does not interfere with the working piece.

However, the retraction device is still disadvantageous in that it is necessary to additionally provide such a swinging cylinder and a control device therefor, which costs a great deal.

Almost all the conventional numerical control devices are of the type that numerical instructions are issued by means of paper tapes and are read by a tape reader, whereby numerical control is carried out. Recently, as a result of the remarkable development of semiconductor memory devices, numerical control is carried out by storing numerical instructions is semiconductor memory devices in a numerical control device instead of paper tapes. It should be noted that, in such a system, its instruction giving method is substantially equivalent to the conventional method using paper tapes; that is, instruction data on the paper tape is merely transferred into the semiconductor memory devices. That is convenient in a sense due to the following reason: As the conventional paper tape can be utilized as memory means, as it is, it is unnecessary for the numerical control programmer to make additional studies, and the conventional paper tape can be used as it is.

However, the conventional method still involves problems to be solved with respect to operability in a certain control and the efficiency of use of memory device. For instance, in the case where a number of numerical control programs for different working pieces are stored in a memory device in one numerical control device and the numerical control programs thus stored should be selectively used, a method of classifying the programs for storing them and of selecting a desired one out of the number of numerical control programs must be provided. In the conventional method, only one program is allowed to be present in the memory device of the numerical control device. Therefore, in processing different working pieces, it is necessary to input different programs in the memory device. Accordingly, in the case where it is necessary to frequently change the kinds of working pieces to be processed, it takes a relatively long time to input the programs into the memory device. This is a serious problem.

The numerical value display unit of a conventional numerical control device is independently provided for position display only. In a recent numerical control device in which manual data input (hereinafter referred to merely as "MDI" when applicable) is effected directly from the panel, i.e. desired data are inputted directly from the panel, the display unit on the panel is used only for manual data input and cannot be used for position display.

Thus, the conventional numerical control device is disadvantageous in that two display units, i.e. the position display unit and the manual data input display unit, must be separately provided on one numerical control device as described above, and therefore the circuitry is necessarily intricate and the panel is relatively larger, which increase the manufacturing cost.

In general, in bending a plate, the rise dimension (A) is delicately affected by the difference in thickness, material and bending angle of the plate, or the working piece, the difference in bending configuration, and other various factors. Therefore, even if numerical instruction data are inputted into a numerical control device as indicated on the drawing, the dimensions of the actually finished working piece scarcely coincide with those on the drawing; that is, they include errors. In addition, it is necessary that the punch lowering distance (B) is also made somewhat different according to the above-described various factors.

Thus, in the actual press brake, it is necesary to correct the rise dimension A and the punch lowering distance B, and the distance L between the end of the punch and the back stopper, and a punch lowering distance D are defined as follows:

$L = A - \alpha$ $D = B - \beta$ where $\alpha$ is the correction value for the rise dimension A, and $\beta$ is the correction value of the punch lowering distance B.

In a conventional numerical control device for a press brake adapted to bend a metal plate, or a working piece, a plurality of digital switches for setting a rise dimension, a punch lowering distance and correction values are provided on the panel, so that a rise dimension A, a punch lowering dimension B and correction values $\alpha$ and $\beta$ are set for every process depending on a working piece to be bent.

Such a correction method is provided in compliance with the conventional tool dimension correcting method employed in a numerical control device for machine tool, such as a numerical control device for a lathe. In the tool dimension correcting method, in order to correct the deviation of tool dimensions attributable to wear of the edge of a cutting tool, errors in setting a tool, or the like, for instance six (No. 1 through No. 6) correction value setting units are provided, and the correction value setting units are used for six hexagonal turret tools, respectively, for instance. In this case, correction can be completely achieved by setting suitable correction values for the tools.

However, in the plate bending process, the errors in dimension are not caused by the tools, but by the thickness, bending angle, bending configuration, etc. as was described before. Therefore, depending on bending processes, different correction values must be employed for different processes, and sometimes three correction values $\alpha_1$ through $\alpha_3$ are insufficient to conduct the bending processes.

Furthermore, the necessity for correction is not caused by the tools, but by the contents of processes. Therefore, application of the correcting method provided according to the tool dimension correcting method is not reasonable. Even if the correcting method is employed, the setting will be rather difficult.

SUMMARY OF THE INVENTION

In view of the foregoing, a first object of this invention is to provide a numerical control method in which a positioning electric motor is utilized to retract a back stopper.

A second object of the invention is to provide a numerical control method in which fundamentally, process numbers are arranged in increasing order, a start process number and an end process number are stored in a start process register and an end process register, respectively, to determine the range of processes to be conducted, the processes thus determined are carried out one after another beginning with the process having the start process number, when the process number coincides with the end process number the process is returned to that having the start process number again.

A third object of the invention is to provide a display method for a numerical control device in which one display unit serves as a position display unit and a manual data input display unit, and operability is improved.

A forth object of the invention is to provide a numerical correction method for a numerical control device, in which positioning instruction values and correction values thereof are stored for every process, and in automatic operation the sums of the instruction values and correction values are provided so that the positioning is effected to the sums.

A fifth object of the invention is to provide a numerical control method in which dogs, limit switches and a few electronic circuits are provided to retract a back stopper to a desired position, so that irrespective of the configuration of a working piece the back stopper does not interfere with the working piece.

According to the invention, no particular device such as a cylinder is necessary. Therefore, the method of the invention can be readily practiced at low cost. Furthermore, as for the program the designation of the data 0 or 1 representative of the function of E instruction is merely added. Therefore, the programming can be readily made substantially similarly as in the conventional programming.

A sixth object of the invention is to provide a numerical control method, in which a number of numerical control programs for working pieces can be provided as only one program, which improves the efficiency of use of memory means, and a desired numerical control program can be repeated as many times as desired, whereby it is unnecessary to change the program even when a different working piece is processed, which contributes to the improvement of the working efficiency.

A seventh object of the invention is to provide a numerical control method, in which during automatic operation, program instruction values can be confirmed by simple operation.

An eighth object of the invention is to provide a numerical control method, in which correction values can be set to optimum ones for every process, which makes it possible to provide a number of processes, and setting and changing the instruction values and correction values can be readily achieved by using a keyboard switch, which remarkably improves the work efficiency.

The nature, principle and utility of the invention will become more apparent from the following detailed description when red in conjunction with the accompanying drawings.

Figure 5A:
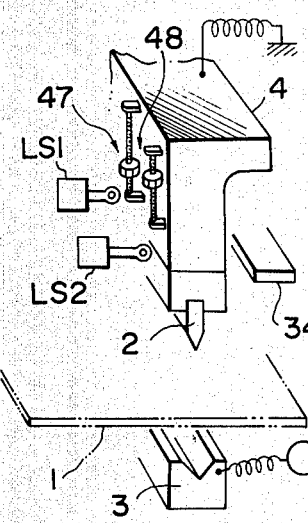
Figure 5B:
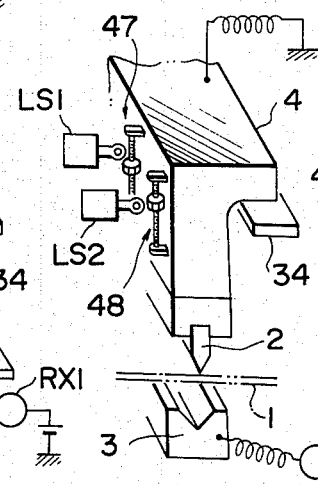
Figure 5C:
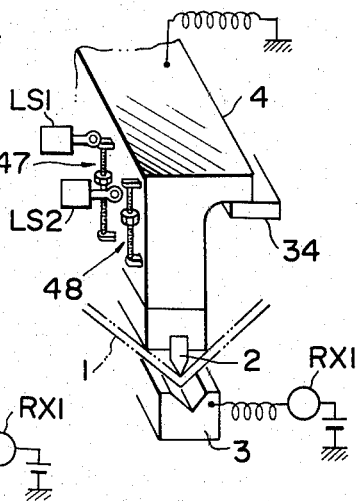
Figure 6:
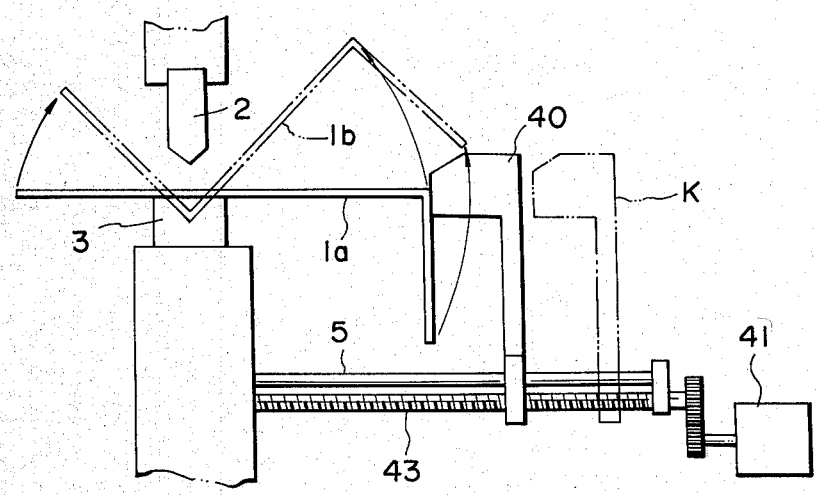
Figure 7A:
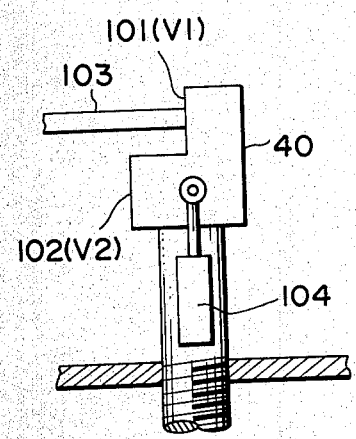
Figure 7B:
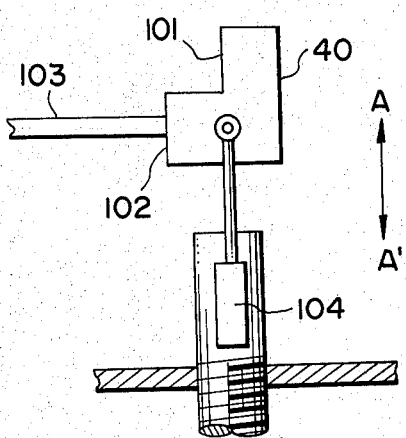
Figure 8:
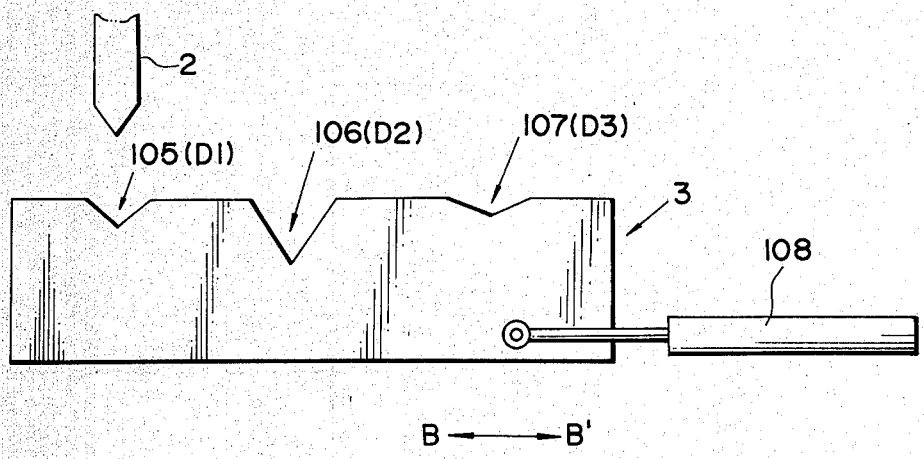

The parts (a) through (c) of FIG. 5 are perspective views of a punch and a die, for a description of the operation of the punch;

FIG. 6 is a front view for a description of the retraction operation of the back stopper;

FIG. 7 is an explanatory diagram showing one modification of the back stopper;

FIG. 8 is a front view of a die having a plurality of grooves;

FIG. 9 is a diagram indicating one example of the program data for various processes;

FIG. 10 is a diagram showing one modification of the punch; and

FIG. 11 is a diagram showing one example of the display of tool instruction data.

DETAILED DESCRIPTION OF THE INVENTION

Figure 1:
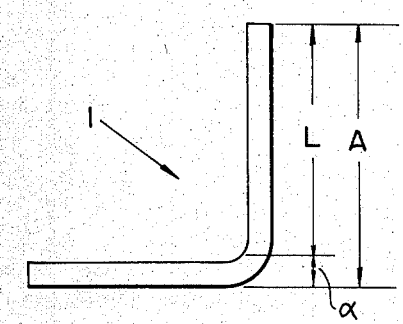
FIG. 1 is a side view of one example of a working piece.
Figure 2:
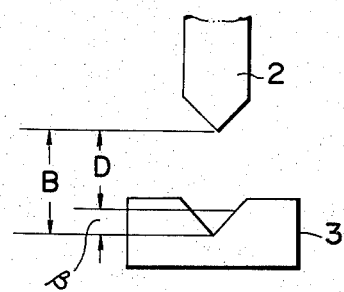
FIG. 2 is an explanatory diagram showing the positional relation between a punch and a die.
Figure 3:
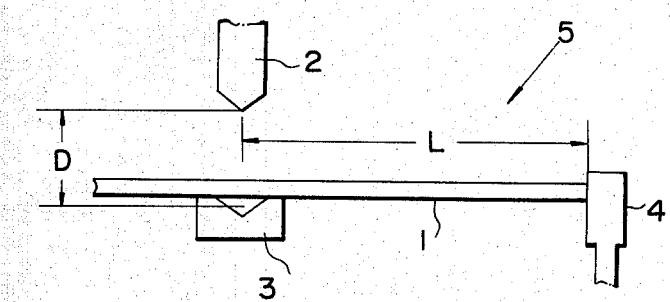
FIG. 3 is also an explanatory diagram showing the postion of a back plate with respect to the punch and the die.

FIG. 1 shows one example of the working piece which has been bent. The dimension A is the sum of a dimension L and a correction value $\alpha$. The dimension L is the distance between the end of a punch 2 and a back stopper 4 as shown in FIG. 3. The actual lowering distance of the punch 2 is obtained by subtracting a correction value $\beta$ from the distance B between the end of the punch 2 and the die 3 as shown in FIG. 7.

In the case of FIG. 1, a flat plate is bent; however various materials may be bent. For instance, in FIG. 6, a bent member 1a is subjected to bending. In the case of FIG. 6, the working piece and the back stopper interfere with each other and the working piece cannot be sufficiently bent as was described before, and therefore in bending the working piece the back stopper 40 is retracted.

Figure 4:
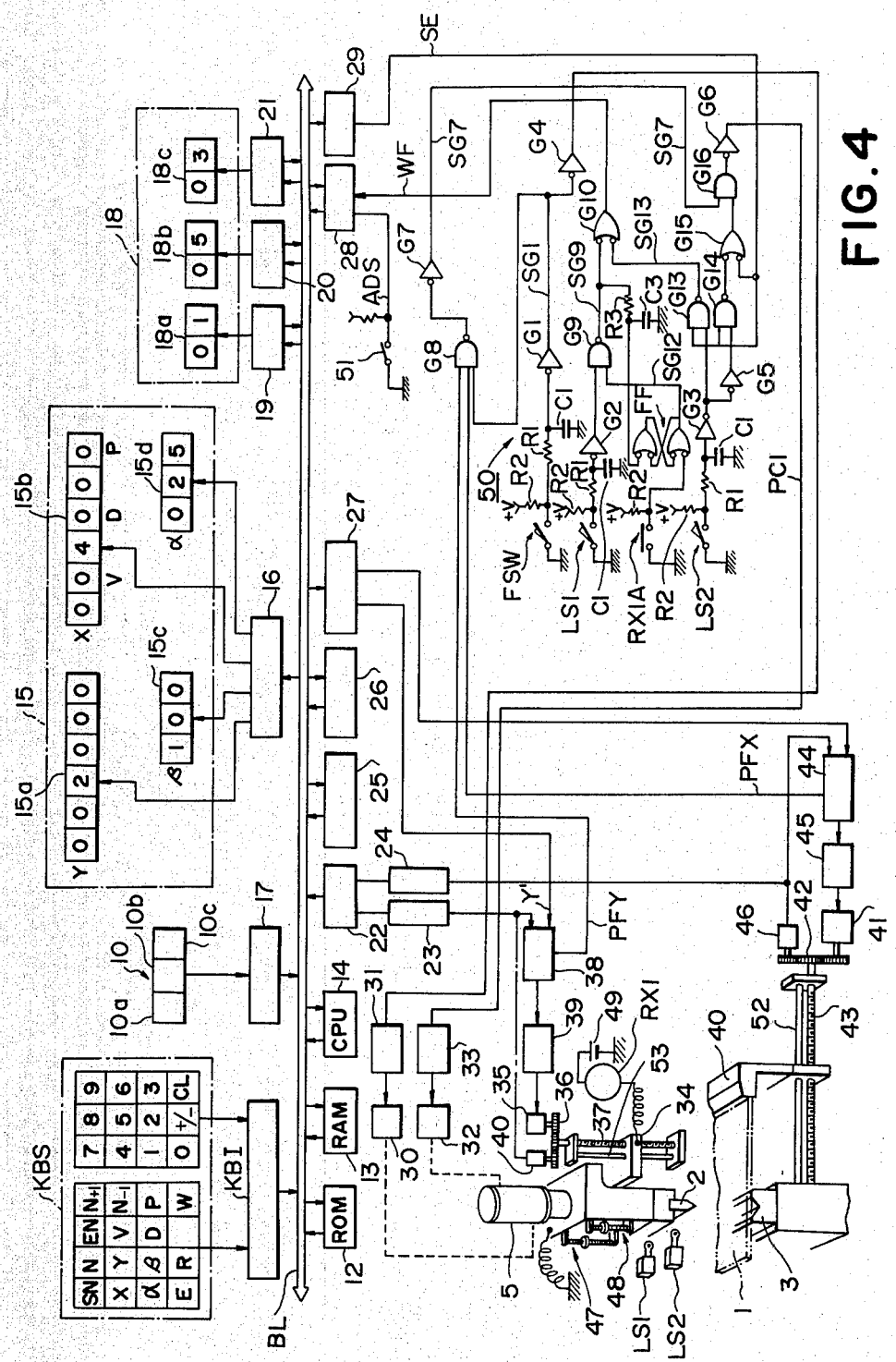
FIG. 4 is a circuit diagram showing one example of a control device for practicing a numerical control method according to this invention.

FIG. 4 shows the entire arrangement of a control device for practicing the numerical control method according to the invention. The control device has a control section comprising: a keyboard switch KBS for inputting various data; an instruction or present value display section 15, a process display section 18; a central processing unit 14; registers; and a logical circuit 50.

The keyboard switch KBS is adapted to input NC program data, correction values and process sequence program data. Keys W and R are provided to issue instructions "write" and "read", respectively. Keys X and Y are provided to set a back stop position and a punch lowering distance, respectively. Keys SN and EN are adapted to set "a start process" and "an end process" in cyclic operation, respectively. Keys α and β are used to input correction values α and β, respectively. A key N is used to set a process. Furthermore, a key V is used to set a vertical position of the back stopper 40; a key D, a groove position of the die 3; a key P, a kind of punch; and a key E, the retraction of the back stopper in bending a working piece.

The data from these keyboard switches are applied through a keyboard interface KBI to a bus line BL.

A mode change-over switch 10 comprises: an automatic operation mode switch 10a; a manual operation mode switch 10b; and a manual data input (MDI) mode switch 10c. The output signals of these mode switches 10a, 10b and 10c are applied through an input circuit 11 to the bus line BL.

The central processing unit 14 operates to write the above-described programs into a random access memory 13 (hereinafter referred to merely as "a memory 13") and to perform other various controls according to control programs stored in a read-only memory 12 (hereinafter referred to merely as "a memory 12").

The display section 15 comprises display units 15a and 15b and correction value display units 15c and 15d, to display various program values according to signals from a display output control section 16. The display unit 15b is adapted to display the program value of the back stopper and the present value, the position of the stopper, the position of the die, and the kind of punch. The display unit 15a is adapted to display the program value of the aforementioned punch lowering distance, and the present value.

The display section 18 comprises display units 18a, 18b and 18c. The display units 18a and 18b are adapted to display cyclic process numbers in the automatic operation. More specifically, the display unit 18a is adapted to display a start process number in a cycle, and the display unit 18b is adapted to display an end process number in the cycle. The display unit 18c is used to display the present process number. The outputs of the register 19, 20 and 21 are applied to the display units 18a, 18b and 18c, respectively.

An input circuit 22 is adapted to apply the outputs of a Y-axis counter 23 and an X-axis counter 24 to the bus line BL. A register 25 is adapted to store correction values α and β. A register 26 operates to store an X value, a Y value, correction values α and β, a back stopper position V, a side position D and a kind of punch P. A numerical value instruction register 27 is adapted to store values $(X+\alpha)$ and $(Y+\beta)$.

An input circuit 28 is adapted to apply a work completion signal WF and an automatic operation start signal ADS to the bus line BL.

The punch 2 is fixed secured to the punch holder 4 which is moved up and down by a hydraulic cylinder 5. An electromagnetic valve 30 is operated by the output of a drive circuit 31, to retract the cylinder 5. An electromagnetic valve 32 is operated by the output of a drive circuit 33, to extend the cylinder 5.

The lower position of the punch 2 is controlled by a stopper 34 which is moved vertically by a screw 37 which is turned through a gear system 36 by an electric motor 35. As long as the output of a positioning control circuit 38 is applied through a drive circuit 39 to the motor 35, the stopper 34 is moved vertically. The position of the stopper 34 is detected by a position detector 40, and the detection signal is fed back to the positioning control circuit 38 and is applied to the Y-axis counter 23. The positioning control circuit 38 provided a positioning completion signal PFy when the position of the stopper 34 coincides with the Y value provided by the numerical value instruction register 27.

The back stopper 40 is moved by a screw 43 which is turned through a gear system 42 by an electric motor 41. As long as the output of a positioning control circuit 44 is applied through a drive circuit 45 to the motor 41, the back stopper 40 is moved. The position of the back stopper 40 is detected by a position detector 46, and the detection signal is fed back to the positioning control circuit 44, and is applied to the X-axis counter 24. The positioning control circuit 44 outputs a positioning completion signal PFx when the position of the back stopper 40 coincides with the X value outputted by the numerical value instruction register 27.

Dogs 47 and 48 are mounted on the punch holder 4 in such a manner that they can be positioned as desired. The dogs 47 and 48 are adapted to operate limit switches LS1 and LS2 when the punch holder 4 is moved to predetermined upper and lower positions, respectively. A battery 49 and a relay RX1 are connected between the stopper 34 and the ground, and the punch holder 4 is grounded directly by a wire. Therefore, when the punch holder is lowered to be brought in contact with the stopper 34, current flows from the battery 49 through the relay RX1, the stopper 34 and the punch holder 4 to the ground; that is, the relay RX1 is energized to close its contact means RX1A.

The logical circuit 50 comprising gates G1 through G16 is adapted to receive signals provided by a foot switch FSW, the limit switches LS1 and LS2, and the relay contact means RX1A and a relief instruction signal SE, to provide the work completion signal WF and control signals for controlling the electromagnetic valves 30 and 32.

First, the case where NC program data and process number program data are stored in the memory RAM by the operation of the keyboard switch KBS will be described (tool instruction being described later).

For instance process number N "01", "02", "03", ... of a process number program are allowed to correspond to the addresses "01", "02", "03", ... in the memory RAM. In the process number "01", the back stop position is set to X=100.0, the punch lowering distance is set to Y=2.00, the correction values for them are set to α=+5.0 and β=−0.30, and the E instruction to 0; in the process number "02", the back stop position is set to X=150.0, the punch lowering distance is set to Y=2.20, the correction values for them are set to α=−2.0 and β=+0.10, and the E instruction is set to 1; in the process number "03", the back stop position is set to X=300.0, the punch lowering distance is set to Y=2.20 the correction value are set to α=+0.0 and β=+0.10, and the E instruction is set to 0; and so forth.

In this case, first of all, the mode switch 10c is turned on, to provide the manual input mode. Then, the keyboard switch KBS is operated as follows: In this connection, the keys to be operated will be indicated by their key names such as "N", "X", "I", and "O" in the following description, when applicable.

N→0→1→W→X→1→0→0→0→W→Y→2→0→0-
→W→α→5→0→w→β→+∠ (−)→3→0→W→E→0-
→W→N→0→2→W→X→1→5→0→0→W→Y→2→2-
→0→W→α+∠ (−)→2→0→W→β→1→0→W→E-
→1→W→N→0→3→W→X→3→0→0→0→W→Y→2-

→2→0→W→α→0→0→W→β→1→0→W→E→0→W→ . . .

When program data are inputted, the central processing unit 14 causes the memory 13 to store each program value whenever the key W is depressed. These process number programs and NC program data are stored in the memory 13 as shown in FIG. 9.

Thus, a series of NC program data in keyboard switch KBS are stored, in the order of process numbers, in the memory 13.

Then, upon depression of the keys SN, 0, 1 and W of the keyboard switch KBS in the stated order, the central processing unit 14 causes the start process register 19 to store the start process number "01". Similarly, upon depression of the keys EN, 0, 5 and W in the stated order, the central processing unit 14 sets the end process number "05" in the end process register 20. These registers 19 and 20 are used to set the start and end of a process, respectively. The start process number "01" and the end process number "05" are displayed on the start process display unit 18a and the end process display unit 18b, respectively.

When the operator turns on the automatic mode changeover switch 10a, then the operation is started, and the central processing unit sets the content "01" of the start process register 19 into the process register 21. Then, the central processing unit 14 reads the content "01" of the process register 21, i.e. the NC program data of the process number "01" out of the memory RAM and inputs it into the numerical value program register 26, corrects the X and Y values of the register 26 with the correction values in the correction value register 25 to provide X' and Y' values, and sets the resultant instruction values X' and Y' into a numerical value instruction register 27. The instruction values X' and Y' are obtained by correcting the program values X and Y with the correction values α and β, and in this case X'=105.0 (=100.0+5.0) and Y'=1.70 (=2.00−0.30).

The positioning control circuit 44 outputs a control signal in response to the instruction value X' from the instruction register 27. The control signal is applied through the drive circuit 45 to the motor 41 to rotate the latter 41. The rotation of the motor is transmitted through the gear system 42 to the screw 43 to rotate the latter 43 to move the back stopper 40. The position detector 46 detects the present position of the back stopper 40 to provide a detection signal, which is applied to the positioning control circuit 44. Thus, the back stopper 40 is set at a position defined by the instruction value X' (=105.0 mm). Upon completion of the positioning of the back stopper 40, the positioning completion signal $PF_X$ is raised to "1".

Similarly, the positioning control circuit 38 outputs a control signal in response to the instruction value Y' from the instruction register 27. The control signal is applied through the motor drive circuit 39 to the motor 35 to rotate the latter 35. The rotation of the motor 35 is transmitted through the gear system to the screw 37 to rotate the latter 37, to move the stopper 34 along the guide 53. The position detector 40 detects the present position of the stopper 34 to provide a position signal, which is applied to the positioning control circuit 38. Thus, the position of the stopper 34 is set to the instruction value Y' (=1.70 mm). Upon completion of the positioning of the stopper 34, the positioning completion signal $PF_Y$ of the positioning control circuit 38 is raised to "1".

The E instruction of the process "01" is 0, and the output signal SE of the instruction register 29 is changed to "0" by the central processing unit.

When, under this condition, the operator depresses foot switch FSW after a working piece 1 has been abutted against the back stopper 40, then the output SG1 of the gate G1 is raised to "1", as a result of which all the inputs to the gate G8 are at "1", and the output SG7 of the gate G7 is raised to "1". On the other hand, the signal SE is at "0", and therefore the output SG15 of the gate G15 is raised to "1", and the output signal PC1 of the gate G6 is also raised to "1". As a result, the hydraulic cylinder 5 is extended to lower the punch 2. The punch 2 is lowered as illustrated in the parts (a), (b) and (c) of FIG. 5 is the stated order.

When the punch holder 41 strikes against the stopper 34, the lowering of the punch 2 is stopped (FIG. 5 (c)), and simultaneously the relay RX1 is energized to turn on the relay contact means RX1A. As a result, a flip-flop circuit constituted by the gates G11 and G12 is set, and its output signal SG12 is raised to "1". In the course of lowering the punch 2, the dogs 47 and 48 act on the limit switches LS1 and LS2, respectively. However, in this case, the signal SG12 is at "0" and the gate G9 is closed. Therefore, even if the limit switch LS1 is operated, the work completion signal WF is not raised to "1". Furthermore, the signal SE is at "0", and therefore the gates G13 and G14 are closed. Accordingly, whether or not the limit switch LS2 is operated, the signals SG13 and SG14 are maintained at "1".

When the operator releases the foot switch, then the signal SG1 is set to "0", and the signal PC2 is raised to "1". As a result, the cylinder 5 is retracted to lift the holder 4 and accordingly the punch 2. In this case, the signal SG1 is at "0", and therefore the signal SG7 is set to "0", and accordingly the signal PC1 is at "0". The punch 2 is lifted as shown in the parts (c), (b) and (a) of FIG. 5 in the stated order. In the course of lifting the punch 2, between the states shown in the parts (b) and (a), the limit switch LS1 is actuated by the dog 47, and therefore the signal SG2 is raised to "1". In this case, the signal SG12 is at "1", and therefore the signal SG9 is set to "0", and the work completion signal SF is raised to "1". This signal WF "1" is applied through the input circuit 28 to the central processing unit 14. On the other hand, the signal SG9 is applied through a delay circuit made up of a resistor R3 and a capacitor C3 to the gate G11 to reset the flip-flop circuit FF, and therefore the output signal SG12 is set to "0".

Upon reception of the work completion signal WF, the central processing unit 14 allows the content of the process register 21 to step by one; that is, the content is changed to "02". This content of the process register 21 is compared with the content of the end process register 20. When the former is smaller than the latter, then the NC program data of the process number "02" are read out of the memory RAM is accordance with the content "02" of the process register 21. Then, similarly as in the above-described case, the instruction value X'=148.0 (=150.0−2.0) and Y'=2.30 (=2.20+0.10) of the process number "02" are set in the instruction register 27.

The positioning control circuits 44 and 38 control the positioning of the back stopper 40 and the stopper 34 according to the instruction values X' and Y' from the instruction register 27 as described above, and upon completion of the positioning operations, the position completion signals $PF_X$ and $PF_Y$ are raised to "1".

The working piece 1 has been bent with the process "01", and therefore its configuration is as indicated by the solid lines in FIG. 6. It is impossible to bend the working piece as indicated by the chain lines B' in FIG. 6, because bending the working piece so is obstructed by the back stopper 40. Therefore, the E instruction of the NC program is set to 1. As the E instruction of the process "02" is 1, the central processing unit 14 sets the E instruction register to "1", and accordingly the signal SE is raised to "1".

When the operator depresses the foot switch FSW after setting the working piece 1a as shown in FIG. 6, then the signal SG7 is raised to "1". While the holder is lowered as in the parts (a) and (b) of FIG. 5, the limit switch LS2 is not operated by the dog 48, and therefore the signal SG5 is at "1". On the other hand, since the signal SE is at "1", the signal SG14 is set to "0", and therefore the signal SG15 is raised to "1". Furthermore, the signal PC1 is raised to "1", and the punch 2 is lowered as indicated in the parts (a) and (b) of FIG. 5.

When the punch 2 reaches the position shown in the part (b) of FIG. 5 to slightly press the working piece 1, the dog 48 operates the limit switch LS2, as a result of which the signal SG3 is set to "1", while the signal SG5 is set to "0". When punch 2 reaches the position, the dog 47 has operated the limit switch LS1; that is, it has passed over the limit switch LS1. On the other hand, since the signal SE is at "1", the signal SG13 is set to "0", and the work completion signal WF is raised to "1". This signal WF is applied to the central processing unit 14. In addition, the signal SG5 is set to "0", and the signal SG14 is raised to "1". Accordingly, the signal SG15 is set to "0", and the signal PC1 is set to "0". As a result, the lowering of the punch 2 is stopped at that position. If the foot switch FSW is kept depressed by the operator, the signal PC2 is maintained at "0". Therefore, the cylinder 5 is maintained stopped; that is, the punch is not lowered nor lifted.

Under this condition, the punch 2 is maintained abutted against the working piece 1; that is, the working piece 1a is held between the punch 2 and the die 3. Therefore, even if the operator applies a small force to the working piece, the working piece will not be moved. Accordingly, the back stopper 40 therefor the working piece.

Upon reception of the work completion signal SF, the central processing unit 14 increases the content of the process register 21 by one (1) thereby to switch the process over to the process "03". Then, the central processing unit 14 reads the content "03" of the process register 21, i.e. the NC program data of the process number "03", out of the memory 13 to perform calculations as described before, thereby to sets the instruction values X'=300.0 and Y'=2.30 of the process number "03" into the instruction register 27. As the E instruction is 0, the E instruction register 29 is set to "0", and the signal SE is set to "0". Accordingly, irrespective of the state of the limit switch LS2, the signal SG15 is raised to "1". However, in this operation, the positioning of the process "03" has not been accomplished yet. Therefor, the signal PFx is at "0", the signal SG7 is set to "0", and the signal PC1 is maintained at "0". Accordingly, the punch 2 is maintained stopped.

The positioning control circuit 44 moves the back stopper 40 to a position indicated by the chain line K in FIG. 6 in accordance with the instruction value X'. As the back stopper has been moved back to the position in bending the working piece 1a the back stopper and the working piece will not interfere with each other.

Upon completion of the positioning of the back stopper 40, the signal PFx is raised to "1". On the other hand, the instruction value Y' is equal to the instruction value Y' in the process "02", and therefore the signal PFy has been maintained at "1". As the foot switch FSW has been depressed by the operator, the signal SG1 is at "1", and the signal PC1 is raised to "1". Accordingly, the cylinder 5 is extended again to lower the punch 2 to bend the working piece 1a (as indicated by the chain line 1b in FIG. 6).

When the holder 4 is struck against the stopper 34, the lowering of the punch 2 is stopped, and at the same time the relay RX1 is energized to close its contact means RX1A. As a result, the flip-flop circuit FF is set to raise the signal SG12 to "1". When the foot switch FSW is released by the operator, the signal SG1 is set to "0", and the signal PC2 is raised to "1". Therefore, the cylinder 5 is retracted to lift the punch 2. While the holder 4 is being moved upwardly, the limit switch LS1 is operated by the dog 47, and therefore the signal SG2 is raised to "1". Therefore, the signal SG9 is set to "0", and the work completion signal WF is raised to "1". The signal WF at "1" is applied through the input circuit 28 to the central processing unit 14. Upon reception of the signal SF, the central processing unit 14 increases the content of the process register 21 by one (1); that is, the content is changed to "04", and the process is switched over to the process "04".

Thus, the processes are achieved one after another. When the content of the process register 21 reaches "06" which is larger than the content "05" of the end process register 20, then the central processing unit 14 loads the content "01" of the start process register 19 into the process register 21.

The operation from the start process number "01" to the end process number "05" can be carried out as many times as desired, as described above.

In the above-described apparatus shown in FIG. 4, the punch 2 and the die 3 are particular ones, and the back stopper 40 is moved only in a horizontal direction. However, the apparatus may be so designed that a given punch and a given die can be used and the back stopper 40 can be moved in a vertical direction also. One example of such apparatus will be described with reference to FIGS. 7 and 8.

As shown in FIG. 7, the back stopper 40 is movable up and down (in the direction A and A'), and the working piece abutting surfaces 101 and 102 of the back stopper are arranged in the form of two steps. When a cylinder 104 is retracted (FIG. 7,(a)), the working piece 103 is allowed to abut against the surface 101. The position of the back stopper 40 in this case will be represented by VI. When the cylinder 104 is extended (FIG. 7,(b)), the working piece 103 is allowed to abut against the surface 102. The position of the back stopper 40 in this case will be represented by V2.

The die 3 (FIG. 8) can be moved horizontally (in the directions of the arrows B and B') by a cylinder 108. Grooves 105, 106 and 107 having predetermined configurations are formed in the die 3 so that one of the grooves can be selected according a bending operation to be carried out. The positions of the die 3 set when the grooves 105, 106 and 107 are selected will be represented by D1, D2 and D3, respectively.

In this case, the punch 2 may be in the form of an assembly of punches 110a, 110b and 110c, which is turned by a cylinder 110d to select one of the punches. The punches 110a, 110b and 110c will be represented by P1, P2 and P3, respectively.

Thus, in the case where a tool instruction is programmed so that the position of the die 3 is D2, the position of the stopper 40 is V1 and the kind of a punch to be used is P3, the keys should be depressed as follows:

V→1→W, D→2→W, and P→3→W

In this operation, before the key W is depressed, display for V, D and P is effected. Upon depression of the key W, the tool instructions are stored in the memory 13 as described before.

The V, D and P display positions are spaced apart from one another on the general purpose display unit 15b. For instance, the values 1, 2 and 3 for V, D and P are displayed separately from one another as shown in FIG. 11. Therefore, it can be understood at a glance that these values 1, 2 and 3 are not the value of the back stopper position X.

Thus, the values X, V, D and P are displayed on the display unit 15b, and the value Y is displayed on the display unit 15a.

In the case of the automatic or manual operation mode, the central processing unit 14 switches the display units 15a and 15b so as to display position data, so that the position signals of the punch 2 and the back stopper 40 applied thereto through the input circuit 22 are applied to the display units 15a and 15b and the present back stopper position X and punch lowering distance Y are displayed on the display units. Even under this condition, sometimes it is necessary to confirm programmed values as to the back stopper position X, and the punch lowering distance Y, for some reason. In this case, the confirmation can be achieved by depressing the key R in the keyboard switch KBS. Upon depression of the key R, in spite of the automatic or manual operation mode, the central processing unit 14 causes the display units 15a and 15b to display the programmed values.

In the case where it is necessary to confirm the tool instruction program, the confirmation can be achieved by depressing a desired one of the keys V, D and P. As long as the selected key is depressed, the display unit 15b is switched for program display so that the programmed value of a tool corresponding to the depressed key is displayed on the display unit. For instance, upon depression of the key D, the programmed value "2" of the die 3 is displayed on the display unit 15b.

On the other hand, a press brake's tool control device (not shown) sets the stopper 30, the die 40, and the punch 50 to the positions V1, D2 and P3 according to the process number "01" tool instruction program V=1, D=2 and P=3, respectively.

What is claimed is:

1. A numerical control method for use in a numerical control device in which positioning control is successively carried out according to numerical control program instructions to bend a working piece, comprising the steps of:
   programming a back stopper retracting instruction as well as positioning instruction values in a predetermined process;
   subjecting said working piece of normal bending if an escape instruction is not available when a process is carried out;
   stopping the lowering of a punch when said punch abuts against said working piece if, when said process is carried out, said escape instruction is available;
   executing a back stopper retraction program in a process after the lowering of said punch has been stopped; and
   bending said working piece by lowering said punch after said retraction program has been executed.

2. A numerical control method for use in a numerical control device in which a plurality of numerical control programs for various workpieces are programmed into one main program, wherein each control program is comprised of a plurality of individual processes and the main program is such that process numbers are arranged in increasing order, a start process number and an end process number corresponding to a particular control program and predetermined for a particular workpiece are preset in a start process register and an end process register, respectively, the content of said start process register is preset in a process counter when an automatic operation is started, the process counter is incremented as a working process is advanced and the control program is completed, the operation in an end process is ended when the content of said process counter coincides with the content of said end process register, and the content of said start process register is preset in said process counter again, whereby an automatic operation is cyclically carried out from the start process to the end process of each control program.

3. A numerical control method for use in a numerical control device in which numerical control program instructions are successively carried out in order to control the position of a punch so as to bend a workpiece, wherein the position of the workpiece with respect to the punch is controlled by a back stopper, the numerical control method comprising the steps of:
   programming a predetermined process which includes punch positioning and back stopper retraction instruction values;
   bending the workpiece in a normal manner according to the process if the process does not contain an escape instruction;
   stopping the lowering of the punch when it abuts against the workpiece if the process does contain an escape instruction, to thereby secure the workpiece in a fixed position with respect to the punch;
   executing the back stopper retraction program in the process after a punch has been stopped; and
   bending the workpiece by resuming the lowering of the punch after execution of the retraction program has been completed.

4. A numerical control device in which a plurality of numerical control programs are employed for operating on various workpieces, wherein each control program is comprised of a plurality of processes and wherein the processes for all of the control programs are programmed into one main program in such a manner that process numbers corresponding to each control program are arranged in an increasing order, comprising:
   a start process register for storing a start process number of a desired control program;
   an end process register for storing an end process number of the desired control program;
   means for sequentially executing the processes of the desired control program in an order beginning with the start process number and ending with the end process number;
   a current process register for storing the current process number; and comparator means for comparing the content of the current process register with that of the end process register, the content of the start process register being transferred to the current process register after completion of the end process, whereby workpiece operations can be performed in accordance with different control programs without manually setting the process number for each operation.

5. A numerical control method for use in a numerical control device in which numerical control program instructions are successively carried out in order to control the position of a punch so as to bend a workpiece, wherein the position of the workpiece with respect to the punch is controlled by a back stopper, the numerical control method comprising the steps of:

programming a plurality of predetermined processes which include punch positioning and back stopper retraction instruction values, bending the workpiece in a normal manner according to a first process if the process does not contain an escape instruction;

stopping the lowering of the punch when it abuts against the workpiece if the first process does contain an escape instruction, to thereby secure the workpiece in a fixed position with respect to the punch;

executing the back stopper retraction program in a second process after the punch as been stopped to move the back stopper away from contact with the workpiece; and bending the workpiece by resuming the lowering of the punch after execution of the retraction program has been completed.

6. A numerical control method according to claim 5 wherein the step of bending the workpiece in a normal manner comprises the steps of initially moving the back stopper in accordance with the instruction values of the first process and subsequently moving the punch to bend the workpiece.

7. A numerical control method according to claim 5 wherein the step of stopping the lowering of the punch includes the step of generating a work completion signal, as if a bending operation had been completed, when the punch abuts against the workpiece to thereby enable the second process to begin.

* * * * *